US008679382B2

(12) United States Patent
Hair et al.

(10) Patent No.: US 8,679,382 B2
(45) Date of Patent: Mar. 25, 2014

(54) TIRE UNIFORMITY CORRECTION

(75) Inventors: Clarence Hair, Greenville, SC (US); Timothy B. Rhyne, Greenville, SC (US); Patrice Estor, Greer, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 88 days.

(21) Appl. No.: 13/128,891

(22) PCT Filed: Nov. 26, 2008

(86) PCT No.: PCT/US2008/084769
§ 371 (c)(1),
(2), (4) Date: May 12, 2011

(87) PCT Pub. No.: WO2010/062288
PCT Pub. Date: Jun. 3, 2010

(65) Prior Publication Data
US 2011/0221086 A1    Sep. 15, 2011

(51) Int. Cl.
*B29C 45/76*    (2006.01)
(52) U.S. Cl.
USPC ....... 264/40.1; 264/36.14; 264/501; 264/502; 264/326; 264/328.3; 264/912; 264/293; 264/294; 264/313; 425/15; 425/16; 425/17; 425/18; 425/22; 425/24; 425/25; 425/26; 425/35

(58) Field of Classification Search
USPC ............ 264/40.1, 36.4, 501, 502, 326, 328.3, 264/912, 36.14, 293, 294, 313; 425/15, 16, 425/17, 18, 22, 24, 25, 26, 35
See application file for complete search history.

(56) References Cited

U.S. PATENT DOCUMENTS

| | | | |
|---|---|---|---|
| 5,458,176 A * | 10/1995 | Rhyne | 152/556 |
| 5,616,859 A | 4/1997 | Rhyne | |
| 6,083,268 A | 7/2000 | Kelsey et al. | |
| 6,260,596 B1 * | 7/2001 | Ubukata et al. | 152/534 |
| 2007/0145623 A1 * | 6/2007 | Hair | 264/40.1 |

OTHER PUBLICATIONS

PCT International Search Report for PCT/US2008/084769ed Jan. 27, 2009.

* cited by examiner

*Primary Examiner* — Jeffrey Wollschlager
*Assistant Examiner* — Stella Yi
(74) *Attorney, Agent, or Firm* — Dority & Manning, P.A.

(57) ABSTRACT

Improved methods and apparatus are disclosed for correcting one or more uniformity characteristics in a tire and particularly to correction in a low profile tire or a tire having a projection along the sidewall. The uniformity characteristic may be a radial force variation, conicity, or both. Correction is accomplished by stretching portions of the tire architecture to create permanent deformation.

14 Claims, 10 Drawing Sheets

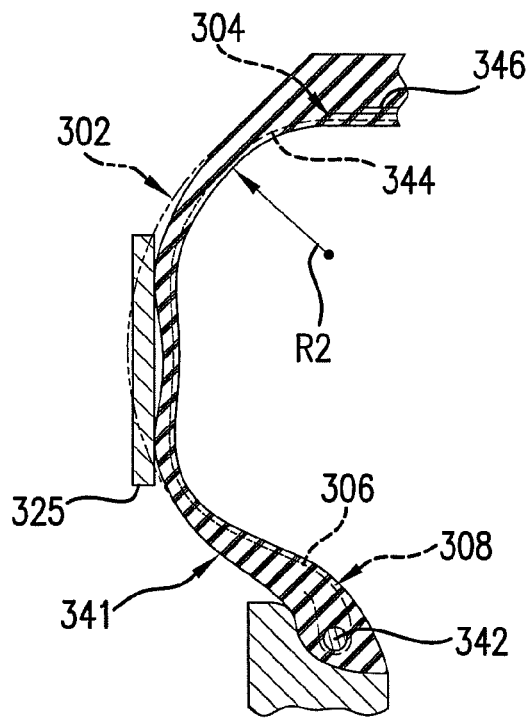
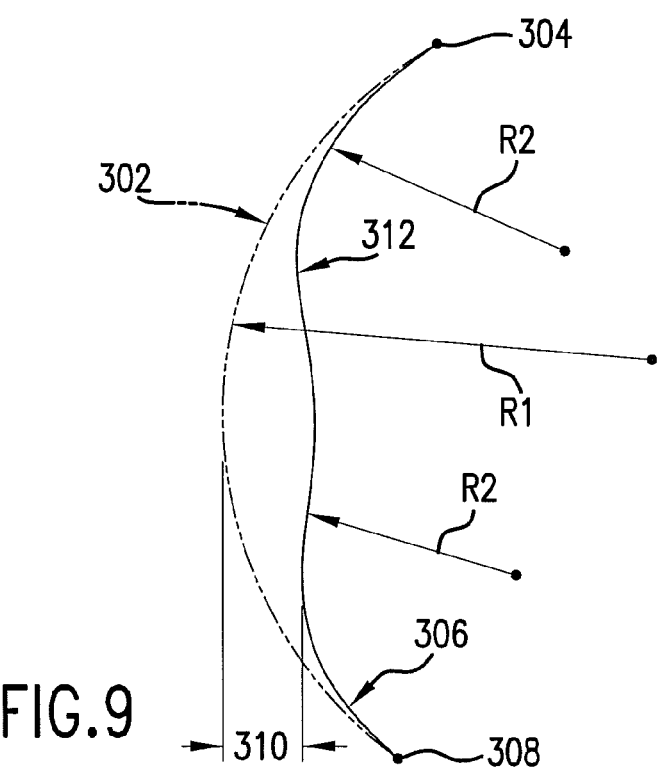
FIG.8
FIG.9

TIRE UNIFORMITY CORRECTION

TECHNICAL FIELD OF THE INVENTION

The present invention relates generally to the correcting of one or more uniformity characteristics in a tire and particularly to correction in a low profile tire or a tire having a projection along the sidewall. The uniformity characteristic may be a radial force variation, conicity, or both. Correction is accomplished by stretching portions of the tire architecture to create permanent deformation.

BACKGROUND OF THE INVENTION

Challenges are presented in attempting to manufacture a toroidal-shaped pneumatic radial tire consistently from tire to tire using sheet or strip materials. For example, a typical pneumatic radial tire includes a pair of axially spaced apart and circumferentially inextensible beads. A carcass ply extends between the beads and is attached to a respective bead at axially opposite end portions of the carcass ply. The carcass ply includes a plurality of parallel reinforcing members that extend between the beads as well. The carcass ply is formed into a toroidal shape and typically has a belt package located radially outward of the carcass ply in a crown portion of the tire. Tread rubber and sidewall rubber are applied over the belt package and carcass ply, respectively.

Once the tire is assembled and cured, the tire may be tested for a uniformity characteristic. "Uniformity" is defined herein as what a "perfect" or "ideal" tire would yield for certain measured characteristics when tested during rotation. "Uniformity characteristic" is defined herein as a deviation in a certain characteristic from what the perfect tire would yield during testing for that same characteristic.

Testing a tire for a uniformity characteristic typically begins with mounting the tire in an inflated condition on a test spindle of a uniformity tester. A test wheel is moved into engagement with the tire to radially deflect a portion of the tire a predetermined amount. The position of the axis of rotation of the test wheel relative to the axis of rotation of the tire is then fixed by a locking mechanism. The test wheel is rotated to cause rotation of the tire. Sensors associated with the test wheel sense radial and lateral forces transmitted by the tire to the test wheel during rotation of the tire.

One uniformity characteristic test which is generally performed on the tire is a test for radial force variation. Radial force variation is typically expressed as a variation in the force against the test wheel that is sensed during rotation of the tire. Radial force variation can be represented by a combination of first harmonic radial force variation through an Nth harmonic radial force variation or as a composite radial force variation. The Nth harmonic is the last harmonic in a Fourier Series analysis of the composite radial force variation which is deemed acceptable to accurately define the radial force variation. Vehicle ride is generally most affected by the first harmonic radial force variation of the tire. The first harmonic radial force variation is often associated with "radial runout" of the tire. Radial runout is defined as a difference in the radius from the axis of rotation to the outer periphery of the tire tread around the tire.

Another uniformity characteristic test which may be performed on the tire is a test for conicity, which is defined as the tendency of a rotating tire to generate a lateral force regardless of the direction of rotation of the tire. Conicity is expressed in terms of average lateral force generated during rotation in both directions of the tire against the load.

Such uniformity characteristics may be attributed to the manufacture of a tire from the sheet and/or strip material. The uniformity characteristics can simplistically be viewed as a deviation from perfect roundness of the outer circumference of the tire, as deviation from spindle load transmitted by a perfect tire during rotation (radial force variation) or as deviation from straight tracking during rotation (conicity).

If the uniformity characteristic of the tire has a magnitude which is less than a predetermined relatively low minimum magnitude and which is deemed not to be detrimental to a vehicle ride or produce undesirable vibrations in the vehicle, the tire may be shipped to a customer. If the uniformity characteristic magnitude is greater than a predetermined maximum threshold magnitude, the tire is scrapped. If the uniformity characteristic magnitude is between the relatively low minimum magnitude and the maximum threshold magnitude, the tire may be suitable for correction.

U.S. Pat. No. 5,616,859, owned by inventors' assignee and incorporated herein by reference, describes an advantageous method and apparatus for tire uniformity correction without grinding. For example, a signal is generated to indicate the magnitude and location of a uniformity characteristic of a tire. At least a portion of one carcass reinforcing member of the tire is permanently deformed at a location determined from the signal so as to correct the uniformity characteristic.

Certain difficulties are encountered when attempting permanent deformation of a carcass member in order to correct a uniformity characteristic in a low profile tire or a tire having a projection along the sidewall such as e.g., a rim protector. As used herein, "low aspect ratio tire" or "low profile tire" includes a tire having a relatively short sidewall height. For low profile tires, attempts to permanently deform only one portion of the carcass reinforcing member are frustrated by several factors including e.g., high carcass strength and short cord length. For tires that have a sidewall feature such as a rim protector, the projection from the sidewall can interfere with the proper constraint of the sidewall during deformation. In either case, certain features of the tire may lead to deformations at unintended locations within the architecture of the tire. Accordingly, a need exists for means by which the correction of uniformity characteristics can be achieved in a low profile tire or a tire having certain projections along its sidewall without introducing undesired deformations.

SUMMARY OF EXEMPLARY EMBODIMENTS

Objects and advantages of the invention will be set forth in part in the following summary description, or may be obvious from the description, or may be learned through practice of the invention. A summary of certain exemplary embodiments and methods of the present invention will now be set forth.

In one exemplary embodiment, the present invention includes an apparatus for reducing the uniformity characteristic of a cured tire through deformation, the tire having a pair of sidewalls and bead portions, the tire defining a mid-circumferential plane. The apparatus includes a first plate for contacting and constraining a portion of a sidewall of the tire during deformation. The first plate has a contact surface forming an angle $\theta$ with the mid-circumferential plane of the tire. The angle $\theta$ is greater than zero degrees. For example, the angle $\theta$ may be in the range of about 5 degrees to about 30 degrees. By way of further example, the angle $\theta$ may be about 10 degrees or, alternatively, about 20 degrees.

The first plate is height adjustable with respect to the sidewall of the tire and is positioned along the sidewall of the tire based on the uniformity characteristic. The first plate may be positioned, for example, along the sidewall of the tire based on the first harmonic of a composite wave form of the tire.

An actuator is provided that is in mechanical communication with the first plate and configured for selectively moving the first plate into contact with the sidewall of the tire. A rim is configured for mating receipt of at least one bead portion of the tire. The apparatus may include a plurality of the plates for contacting and constraining a portion of a sidewall of the tire during deformation. For example, a second plate may be provided for contacting and constraining a portion of the sidewall of the tire during deformation, with the first plate and the second plate being positioned along the same sidewall of the tire based upon decomposition of the composite wave form into multiple harmonics. The overall apparatus may include a pair of supporting rings, one for application to each sidewall of the tire, with at least one supporting ring including the first and second plate.

The apparatus may include a base that is positioned between the first plate and the actuator. A spacer can be positioned between the base and the first plate, whereby the height of the first plate relative to the base may be adjusted. Additional spacers may be used for adjusting the height of other plates as well. Alternatively, the plates may be constructed of varying heights or may be linked to adjustment arms whereby the plate height relative to the actuator can be selectively adjusted.

The present invention also includes exemplary methods. For example, one such exemplary method provides for reducing a uniformity characteristic of a tire through deformation, the tire having sidewalls, the tire defining a circumferential direction and a mid-circumferential plane. The method includes the steps of generating a signal indicative of the magnitude and location about the circumferential direction of the uniformity characteristic for the tire; selecting at least one position about the circumferential direction of the tire for constraint during deformation of the tire, wherein the at least one position is selected as a function of the location of the uniformity characteristic as determined from the signal; determining an angle θ for a contact surface that will contact at least one sidewall of the tire at the at least one position, where angle θ is the angle between the contact surface and the mid-circumferential plane of the tire; constraining the sidewall of the tire using the contact surface having angle θ; and permanently deforming the tire so as to simultaneously reduce the uniformity characteristic.

This exemplary method may include additional steps or modifications thereof. For example, the method may further include the steps of decomposing the signal from the generating step into at least two harmonics, with the selecting step including selecting at least two positions about the circumferential direction of the tire for constraint during deformation of the tire wherein the at least two positions are selected based upon the at least two harmonics from the decomposing step. The step of determining an angle θ may include finite element analysis of a model of the tire. The amount of deformation of the tire in the permanently deforming step may be determined as a function of the magnitude of the signal.

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 8 is a partial cross-sectional view of a tire being constrained.

FIG. 9 is a schematic illustration of what happens to a tire during constraint according to the present invention.

FIG. 10 illustrates a partial cross section of a tire having a rim protector while

DETAILED DESCRIPTION

Figure 1:
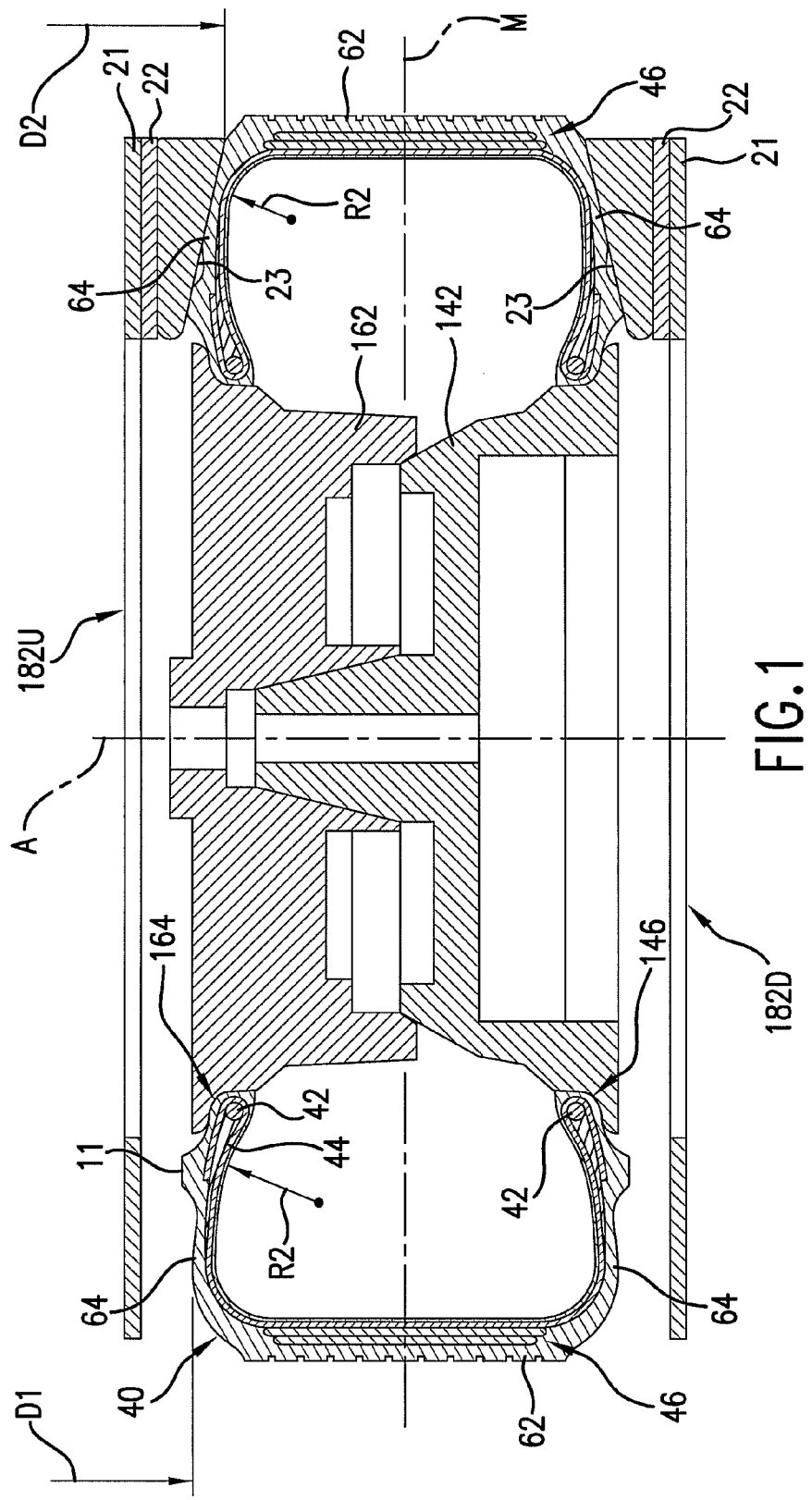
FIG. 1 is a cross-sectional view of a tire mounted in an exemplary embodiment of the present invention for which only a portion is shown in cross section.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention includes these and other modifications and variations.

Figure 10:
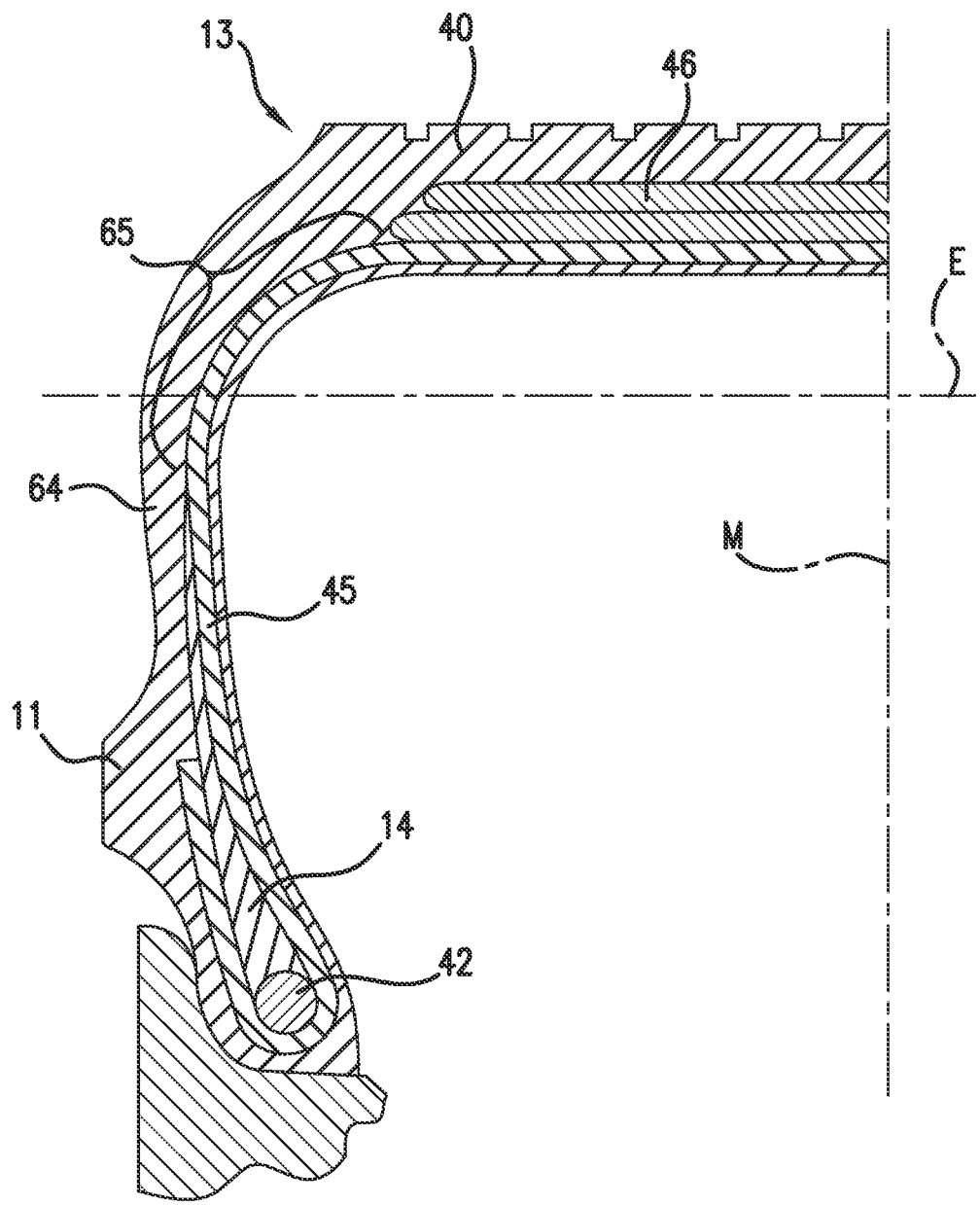
Figure 11:
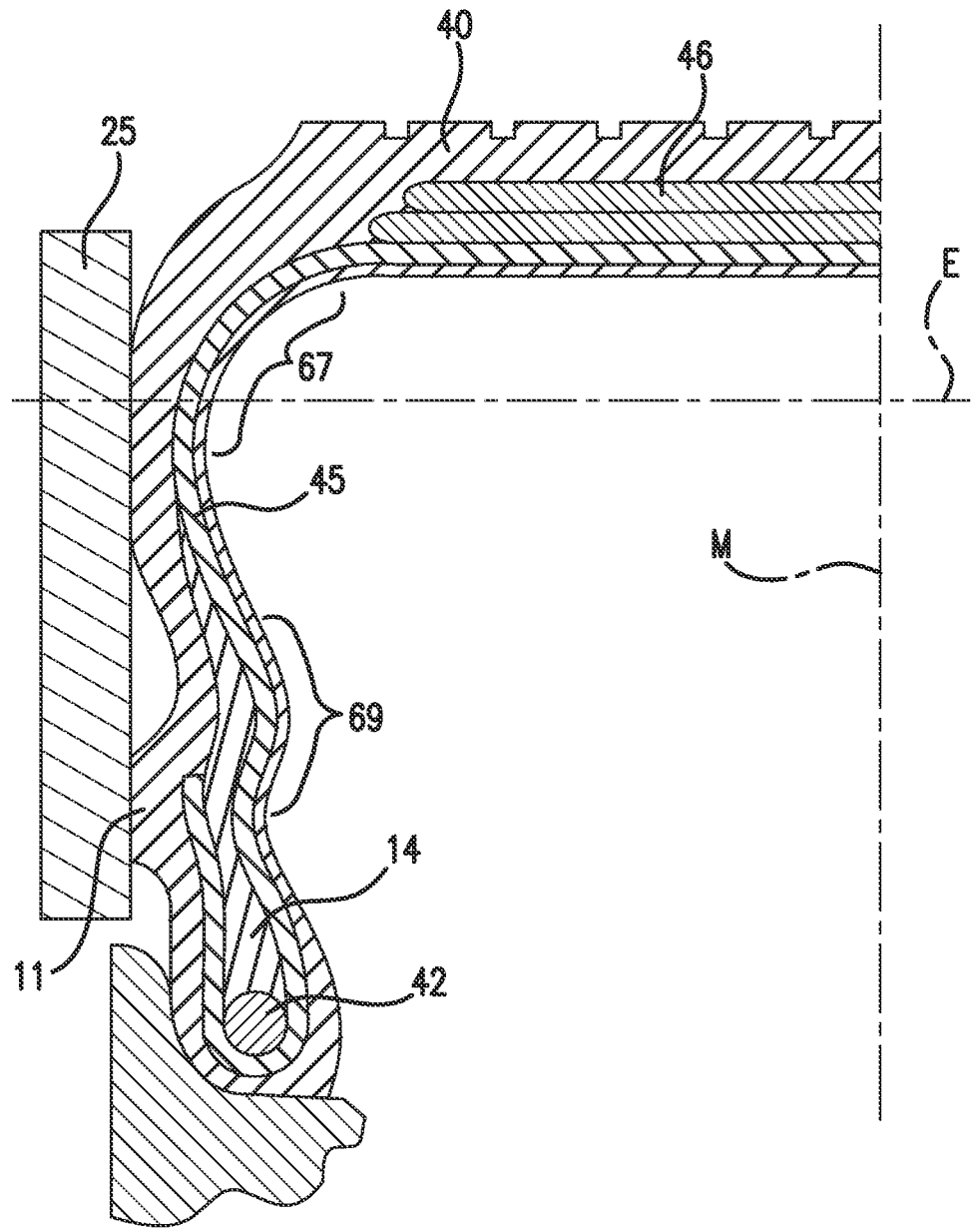
FIG. 11 illustrates undesired deformation of such tire using a flat plate.
Figure 12:
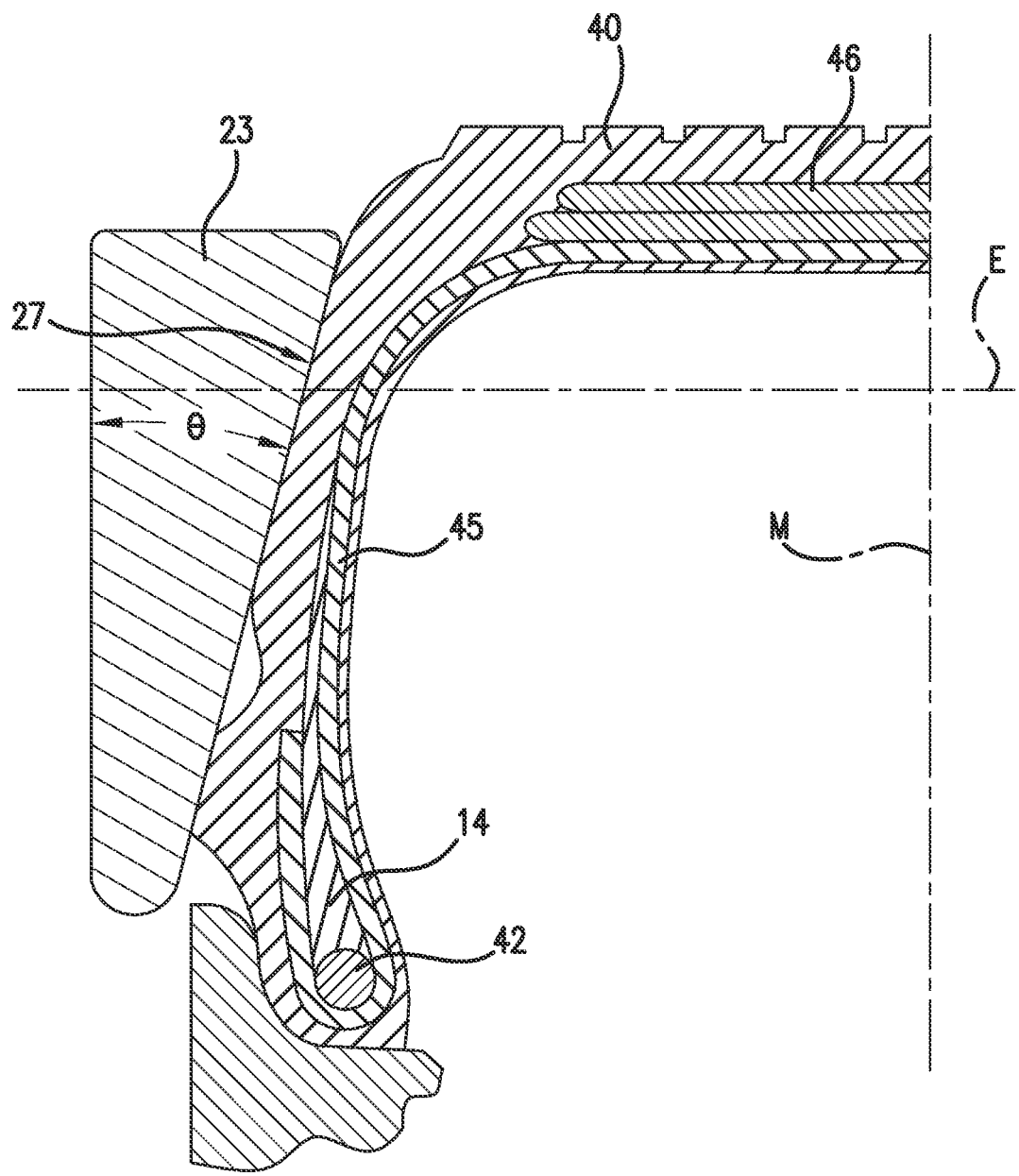
FIG. 12 illustrates the desired deformation of a tire using an exemplary apparatus of the present invention.

As used herein, "equator" means a location along the tire sidewall at the widest extent of the carcass in the portion extending between the tread and the bead of the tire as viewed in a. meridian plane of the tire. In the cross-sections along the median plane that are shown in FIGS. 10, 11, and 12, the equator is designated with a letter "E."

For purposes of describing an exemplary embodiment of the present invention, a radial pneumatic tire 40 undergoing correction of a uniformity characteristic is illustrated in FIG. 1. Tire 40 is rotatable about a longitudinal central axis A. Tire 40 includes a pair of beads 42 which are substantially inextensible in a circumferential direction. The beads 42 are spaced apart in a direction parallel to the axis A. Circumferential is defined as being substantially tangential to a circle having its center at axis A and contained in a plane parallel to the mid-circumferential plane M of the tire.

A carcass ply 44 extends between each of the respective beads 42. The carcass ply 44 has a pair of axially opposite end portions which extend around the respective beads 42 and are secured thereto. The carcass ply 44 includes a plurality of reinforcing members 45 (FIG. 10) extending substantially parallel to one another and each of which are made of a suitable configuration and material such as several polyester yarns or filaments twisted together. It will be apparent that the carcass ply 44 is illustrated as a single ply but may include any appropriate number of carcass plies for the intended use and load of tire 40. The reinforcing member 45 should be constructed from one or more materials that allow plastic deformation without damaging the material. For example, polyester and nylon are suitable materials.

Tire 40 illustrated in FIG. 1 also includes a belt package 46. The belt package 46 includes at least two annular belts. One of the belts is located radially outward of the other belt. Each belt includes a plurality of reinforcing members 45 extending substantially parallel to one another and made of a suitable material such as a steel alloy. Tire 40 also includes rubber for the tread 62 and sidewalls 64. The rubber may be of any suitable natural or synthetic rubber, or combination thereof. Tire 40 is constructed with a rim protector 11 that extends outwardly along the axial direction from the sidewall.

Figure 2:
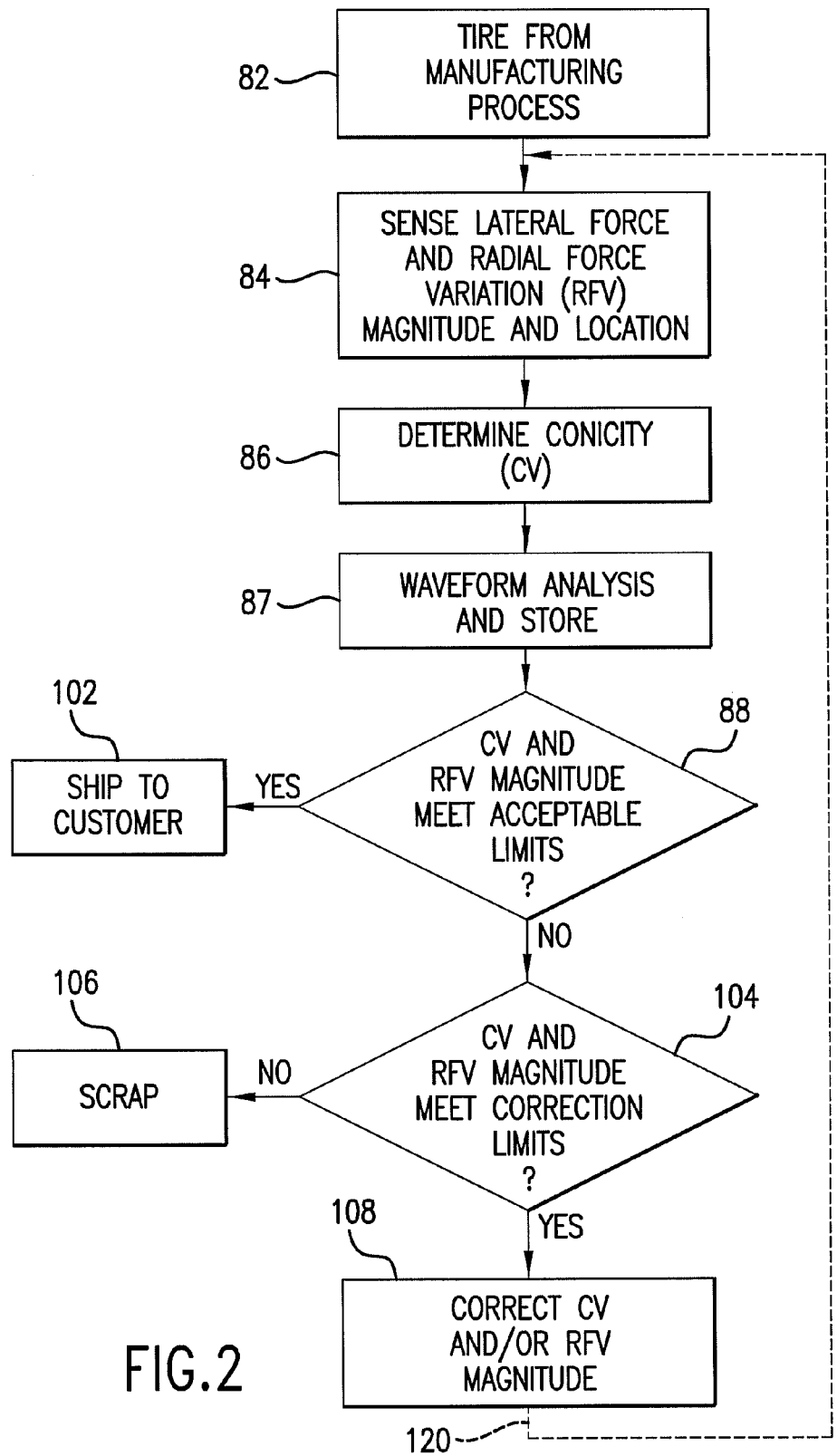
FIG. 2 is a flow diagram of an exemplary method of the present invention. This exemplary method demonstrates correction for both radial force variation and conicity. It should be understood, however, that the present invention includes exemplary methods that would sense and correct only radial force variation, only conicity, or both.

In tire 40, uniformity characteristics may result from the assembly and curing operations in a tire plant. For example, tire 40 is tested after curing and cooling for certain uniformity characteristics, such as radial force variation, ply steer and/or conicity. FIG. 2 is a flow diagram of the processes that tire 40 may undergo after it has been assembled, cured and cooled in operation 82. An exemplary method of the present invention will be described with respect to testing and correction for both radial force variation and conicity as shown in FIG. 2. However, it should be understood that the present invention includes methods that would test and correct only radial force variation, only conicity, or both.

Initially, tire 40 is placed on a uniformity tester (not shown). Certain uniformity testers are well known in the tire manufacturing art. A tire uniformity tester is available from a supplier such as Akron Standard of Akron, OH. Tire 40 is mounted on device (discussed below) which simulates a vehicle rim and is then inflated to the normal recommended operating pressure. Tire 40 is then engaged by a test wheel, which loads the tire to an appropriate predetermined radial load. The relative distance between the axes of rotation of tire 40 and of the test wheel (center-to-center distance) is then fixed. The test wheel is rotated to impart rotation to tire 40. Sensors which are operatively connected with the test wheel sense radial force and lateral force variations from the load applied to tire 40 in operation 84. The test parameters which may be adjusted for the test include applied load, inflation pressure and rolling radius of tire 40. The test parameters are dependent upon the type of tire 40 and the particular size tire tested.

The tendency for tire 40 to generate a lateral force in a direction along axis A during rotation of tire 40 in one direction and when loaded against the test wheel is also sensed in operation 84 with the uniformity tester. The existence of such a tendency is termed lateral force variation. Tire 40 is then rotated in the opposite direction and another lateral force variation is sensed. The sensing of the magnitudes of the lateral force variations and the magnitude around tire 40 of the radial force variation is performed in operation 84. In operation 86, the conicity of tire 40 is determined (the conicity step may be omitted in other exemplary methods of the invention). Conicity magnitude is defined as the average of lateral offsets when tire 40 is rotated in one direction and then rotated in the opposite direction. Lateral offset is defined as the mean of the peak-to-peak lateral force variation when tire 40 is rotated in one direction about its rotational axis when loaded.

Figure 3:
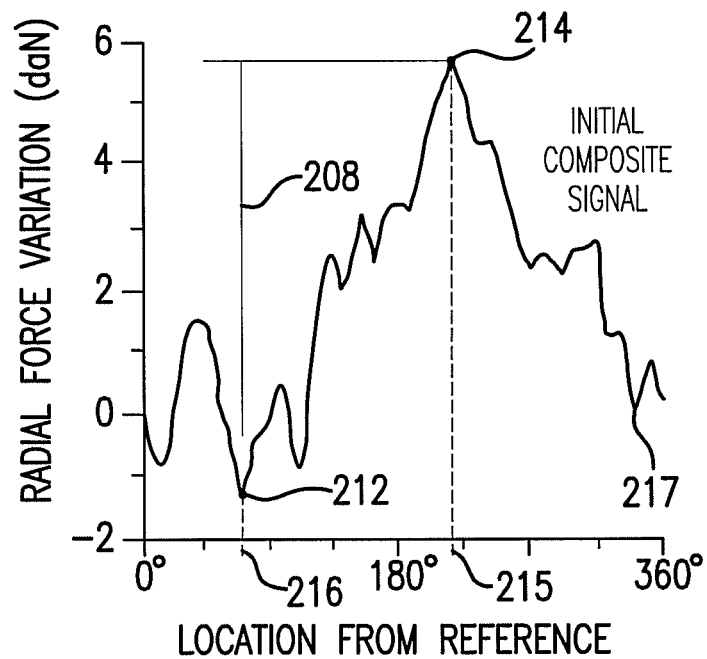
FIG. 3 is a graphical representation of a composite wave form or signal from uniformity testing of a tire.
Figure 4:
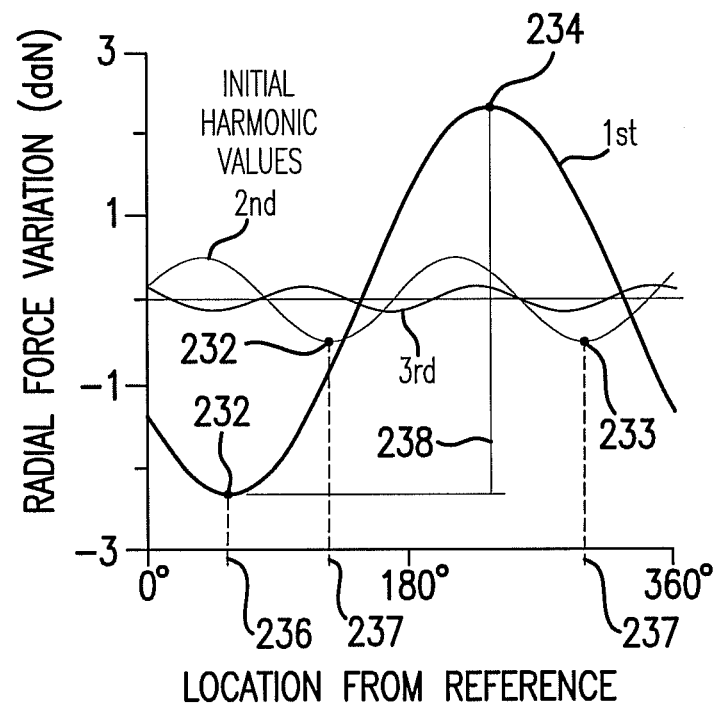
FIG. 4 is a graphical representation of the Nth harmonics of the composite wave form or signal shown in FIG. 3.

In FIGS. 3 and 4 the radial force variation of the uncorrected tire 40, as tested, is graphically illustrated. More specifically, the signal provided from the uniformity tester that represents the radial force variation as a function of circumferential position on tire 40 is represented by the composite wave form illustrated in FIG. 3. This signal or its composite wave form may be decomposed into a number of desired harmonic wave forms as illustrated in FIG. 4. In operation 87 (FIG. 2), the harmonic wave forms are determined in a computer (not shown) by a Fourier analysis of the radial force variation wave form sensed during rotation of the loaded tire 40. In FIG. 4, for clarity of illustration purposes, only the uncorrected first through third harmonic radial force variations in decaNewtons of force variation from test load during rotation of tire 40 are graphically represented as a function of angular location around the tire from a reference location. As shown by comparison of FIGS. 3 and 4, the composite wave form of FIG. 3 is better represented by a greater number of harmonic wave forms as represented in FIG. 4. The analysis and wave forms may be stored in a computer and referenced to a particular tire 40 in operation 87.

Once the conicity and radial force variation magnitudes are determined, such are compared to a respective minimum acceptable threshold limit in operation 88 (FIG. 2). If the absolute value of the conicity magnitude and radial force variation magnitude are less than a respective predetermined minimum threshold magnitude limit, tire 40 is deemed acceptable and no further processing of the tire is needed. Tire 40 is then typically shipped to a customer as indicated in operation 102.

If tire 40 has a magnitude for conicity (absolute value) or radial force variation greater than the corresponding acceptable minimum threshold magnitude limit, another comparison is performed in operation 104. If the conicity (absolute value) or radial force variation magnitudes are greater than a relatively large maximum threshold magnitude limit, tire 40 is deemed uncorrectable. If tire 40 is uncorrectable it is scrapped in operation 106.

If tire 40 falls within a predetermined range of magnitudes for conicity (absolute value) and/or radial force variation, it is forwarded for uniformity characteristic correction in operation 108. For example, if the conicity (absolute value) and/or radial force variation magnitudes are greater than the acceptable minimum threshold magnitude limit for shipping to a customer but less than the relatively large maximum threshold magnitude limit for scrapping, tire 40 may be corrected at a uniformity correction station.

After tire 40 is corrected and allowed to sit for a period of time, for example twenty-four hours, it may be again tested as indicated by the dashed line 120. This "sit period" is sufficient time to take into consideration any viscoelastic relaxation that occurred in tire 40 after correction. If the corrected tire 40 has uniformity characteristic magnitudes below the minimum acceptable threshold limits it is shipped to the customer. If tire 40 does not have an acceptable uniformity character magnitude, it may be scrapped. Preferably, after tire 40 is corrected once, it will be below the acceptable minimum threshold magnitude limit and shipped to the customer.

Figure 5:
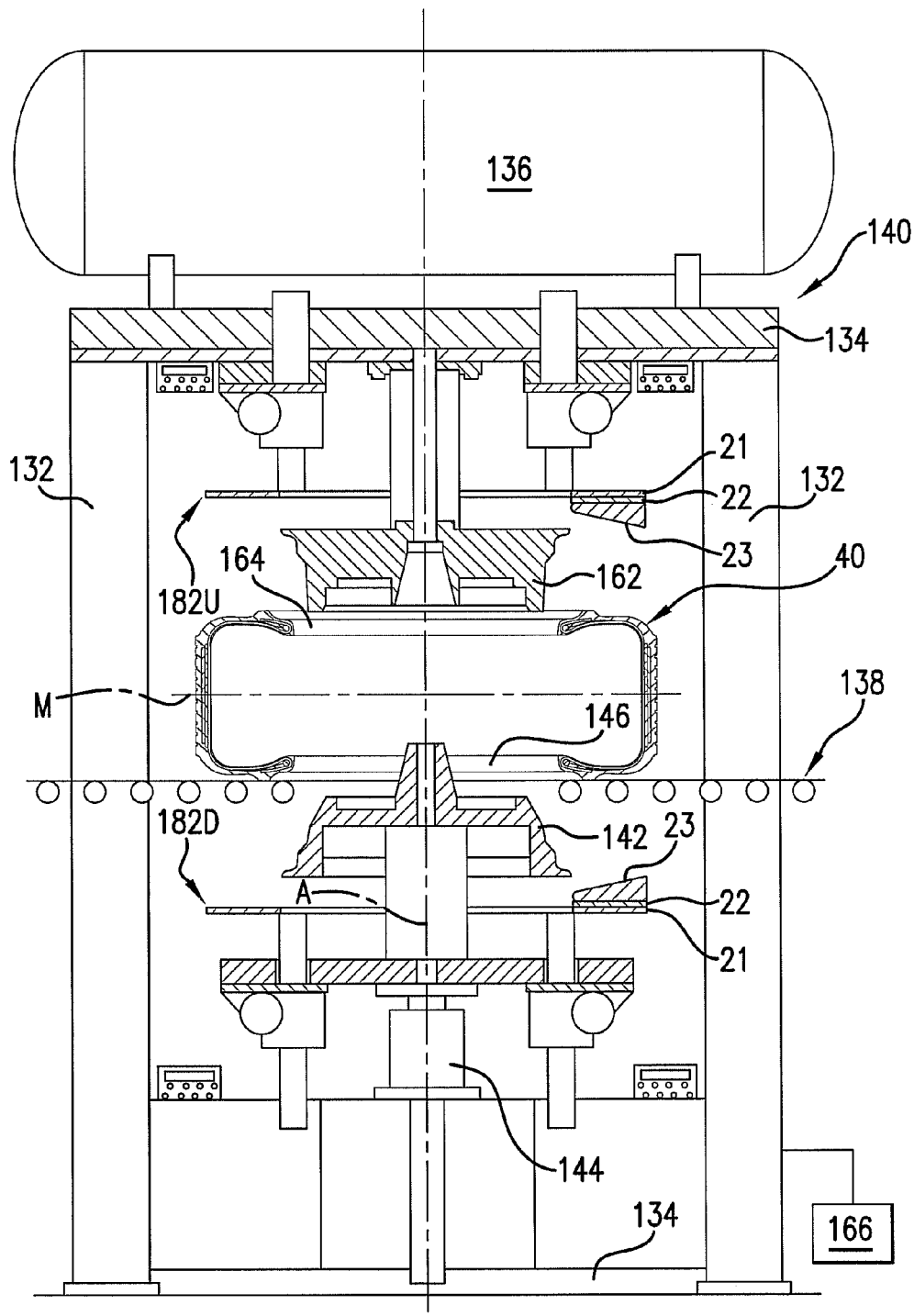
FIGS. 5 and 6 are elevational views of an exemplary apparatus according to the present invention with certain portions of the apparatus and tire shown in cross section.

Once a determination has been made that a uniformity characteristic will be corrected, tire 40 is transported to a correction station 140 such as that illustrated in FIG. 5. The correction station 140 includes vertical frame members 132 as well as upper and lower cross members 134. An air tank 136 may be mounted to the upper cross member 134. The mode of transportation of tire 40 may be manual or automated on a conveyor system 138. Tire 40 is initially supported in the correction station 140 in the position illustrated in FIG. 5. It should be apparent that the correction station 140 could be a stand alone operation or be incorporated into a tire uniformity test machine for a combination test and correct operation.

Figure 6:
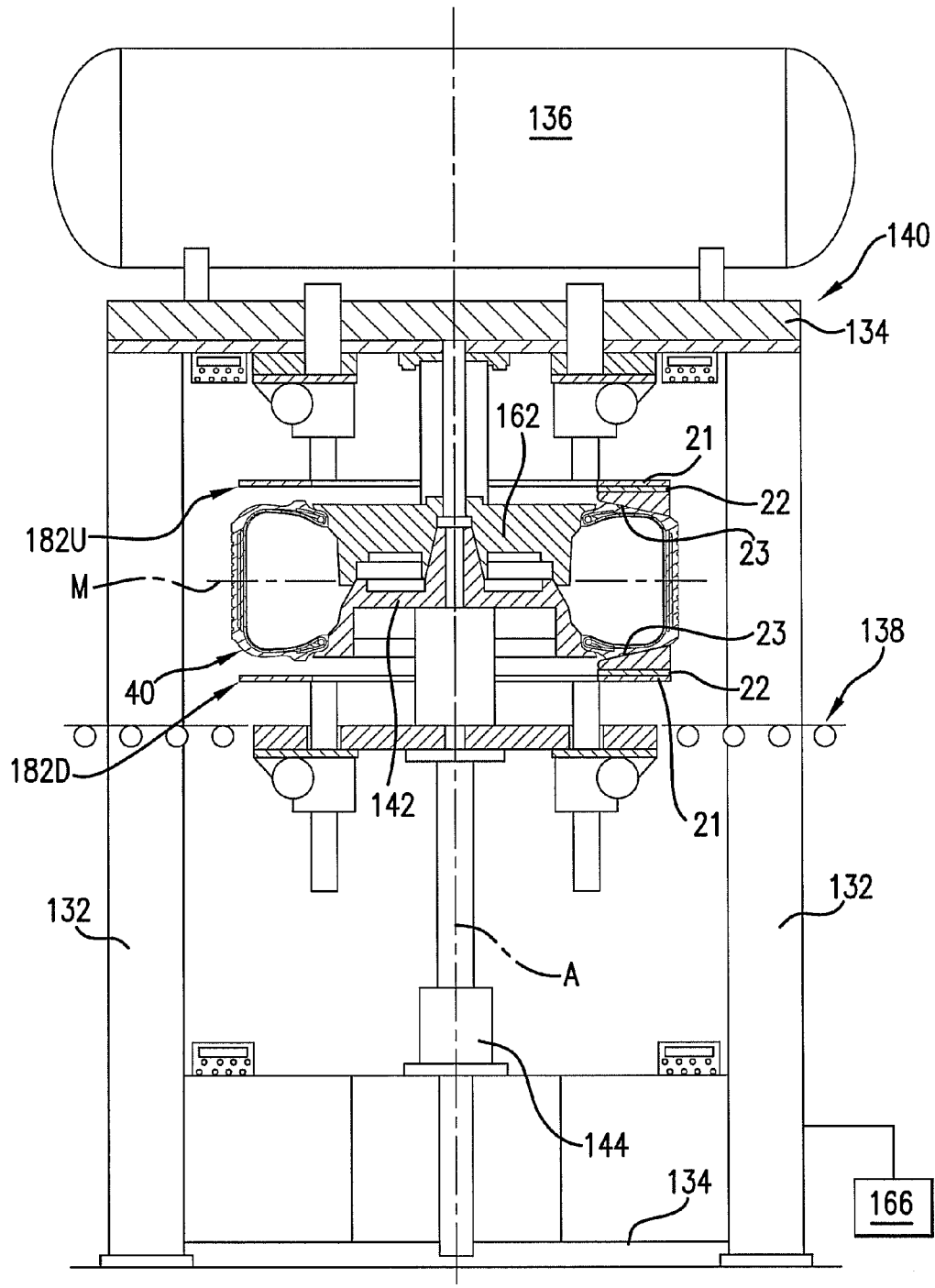

A lower simulated rim mounting 142 is moved upwardly by a main actuator 144 from the position illustrated in FIG. 5 towards the position illustrated in FIG. 6. The lower simulated rim mounting 142 (FIG. 5) is brought into axial engagement with the lower bead area 146 of tire 40. The main actuator 144 continues to raise tire 40 away from the conveyor system 138. Tire 40 then is forced against the upper simulated rim mounting 162 at the upper bead area 164, as illustrated in FIGS. 1 and 6. Tire 40 is inflated with fluid pressure, such as air, to a pressure sufficient to seat the bead areas 146, 164 of tire 40 against the simulated rim mountings 142, 162. Tire 40 is then deflated to a relatively low pressure which is above the surrounding ambient atmospheric pressure and which pressure is approximately equal to one-tenth the recommended operating pressure of the tire.

Once tire 40 is located in the correction station 140, a programmable controller 166 (FIGS. 5 and 6) operably connected with the correction station 140 and a computer determines if conicity correction, radial force variation correction, or both is to be performed. Tire 40 may have an indicator, such as a bar code label or an infrared ink identification that can be read at the tire correction station 140. The indicator can provide information about tire 40 to the controller 166 such as information determined during uniformity testing by a uniformity machine. For example, information related to the identity of the tire (e.g., serial number) and its uniformity characteristics (e.g., the magnitudes and locations of radial force variation and conicity as determined in operation 87 of FIG. 2) may be communicated to the controller 166. The first, second, and/or Nth harmonic may be provided to the controller 166 or, alternatively, controller 166 may itself perform decomposition of the composite wave form into the desired harmonics. The controller 166 or other computer may also determine which of the harmonic wave forms will be corrected. This selection may be based on a number of factors including e.g., the harmonic of greatest magnitude.

For purposes of illustration, assume the first harmonic of the radial force variation as illustrated in FIG. 4 is selected for correction. Only two radial force variation input parameters are required to initiate the first harmonic correction. The magnitude 238 and the location 236 from a reference location on tire 40 provide these parameters. The magnitude is the difference between the soft spot 232 magnitude and the hard spot 234 magnitude. The location is the angular position 236 of the soft spot 232 from the reference. As set forth previously, the peak to peak magnitude 238 may be used to determine whether the tire will be shipped, scrapped, or slated for a correction operation by permanent deformation as described herein.

The magnitude 238 and location 236 of the soft spot can also be used as input parameters to determine control parameters for the correction operation. Correction of the uniformity characteristic is accomplished by permanently deforming (e.g., elongating) at least one, and preferably many, carcass reinforcing members of carcass ply 44 (FIG. 1). The stretching is done preferably by applying relatively high inflation pressure to the interior of tire 40 for a predetermined time. The input parameter of magnitude 238 affects the determination of control parameters such as deflection, time, and pressure (or force) which are applied to tire 40. The input parameter of location 236 (FIG. 4) of the soft spot affects the positioning of tire 40 in the correction station 140. Other input parameters affecting the control parameters include the type and properties of material of the carcass reinforcing member including the diameter, pitch and number of filaments used in the carcass reinforcing member.

Once the controller 166 or other control program has determined what uniformity characteristic will be corrected and the angular location of the correction, the controller 166 determines the amount of correction to be made and provides a signal (which may be hydraulic, pneumatic or electronic) to begin deformation. Tire 40 is oriented within correction station 140 based on the correction that will be made and/or the location of the uniformity characteristic. For example, as illustrated in FIGS. 1 and 6, if a first harmonic radial force variation correction is needed the location 236 of the first harmonic soft spot 232 may be positioned at the far left hand side of the correction station 140, as viewed in FIGS. 1 and 6. This positioning can be accomplished e.g., by using a mark showing the location of the soft spot 232 on the tire or by using the reference point and the angular location in degrees of the soft spot 232 relative to the reference on tire 40. Correcting a first harmonic radial force variation includes inflating tire 40 to a pressure above the recommended operating pressure of tire 40 as a function of input parameters while constraining a portion of the sidewalls (e.g., the hard spot) to control the distribution of the correction around the tire. Stretching and permanently lengthening a portion (e.g., the soft spot) of the carcass reinforcing member can correct the uniformity characteristic of tire 40. Permanent deformation or elongation L is achieved by stretching a carcass reinforcing member beyond its elastic limit and holding it for a predetermined time. The distribution of the amount of lengthening is controlled by constraining the sidewall of tire 40 by an amount that varies around the circumference of the tire. This variation in the amount of stretching about the circumference of tire 40 is a function of the magnitude and location of the uniformity characteristic being corrected and other parameters.

Figure 7:
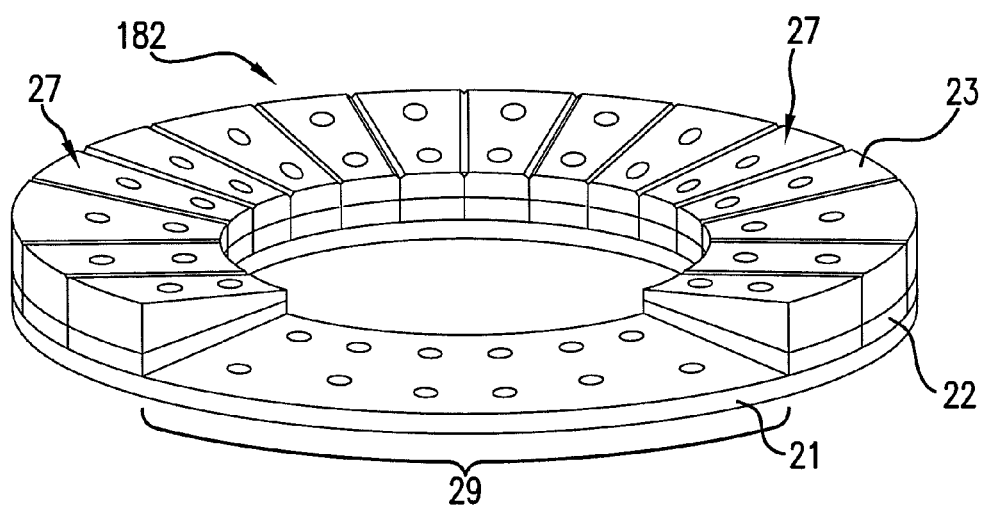
FIG. 7 is an exemplary apparatus for applying constraint to a tire according to the present invention.

An exemplary device 182 for controlling the amount of lengthening of the carcass reinforcing members around the circumference of the tire is illustrated in FIGS. 1, 6, and 7. Referring specifically to FIG. 7, supporting ring 182 includes a plurality of spacers 22 and plates 23. As shown, plates 23 have an angled surface 27 for contacting the tire 40 as will be more specifically described below. The spacers 22 can have varying thicknesses about the circumference of ring 182 so that the height (i.e. the position along the axial direction A of tire 40) of plates 23 can be individually adjusted relative to base 21. Alternatively, the spacers 22 could each be of equal thickness and configured for stacking upon one another so as to adjust the height of each plate 23. In still another alternative, the heights of plates 23 could be varied through adjustment arms placed between the plates 23 and supporting ring 182 or by having plates 23 of varying thickness. As shown in FIG. 7, each plate 23 includes 15 degrees of arc length about the circumferential direction as the ring is divided into positions for a total of twenty-four plates 23. However, the total number of plates 23 (i.e. positions about ring 182) can be varied depending upon e.g., the degree of adjustability desired. Supporting ring 182 includes a portion 29 where no plates 23 or spacers are located. Portion 29 will be positioned along tire 40 at a location(s) where minimal or no constraint is desired during deformation. It should be understood that both sides (i.e., both sidewalls) of tire 40 are constrained during uniformity correction. Accordingly, a supporting ring 182 is applied to both sidewalls of tire 40 as described in the following paragraph. Alternatively, a supporting ring 182 could be applied to only one sidewall of the tire 40; in which case some other element would be applied to provide constraint to the other sidewall.

More specifically, referring again to FIGS. 1 and 6, supporting ring 182 allows for the control of the amount of deformation about the circumference of tire 40. More specifically, as supporting rings 182U and 182D engage an inflated tire 40, both of the sidewalls 64 are constrained, and different axial displacements D1 and D2 result in different deformations depending upon the heights of plates 23 relative to base 21. The amount of deformation at a particular location depends upon the amount of uniformity correction desired. A higher plate 23 height (more axial displacement) can be used to create a maximally constrained portion of tire 40 along its circumference while a lower plate 23 height (or no plates 23 as with portion 29) can be used to create a minimally constrained portion of tire 40 resulting in less or no axial displacement. More correction of the tire (i.e. more deformation) will occur at the location(s) of minimum constraint (left side of FIG. 1) where the radius of curvature R1 is relatively larger and relatively less (or no) correction occurs at the location of maximum constraint (right side of FIG. 1) where the radius of curvature R2 is relatively smaller.

For example, for a correction of the first harmonic, the maximum amount of constraint to be applied for first harmonic radial force variation correction is at the first harmonic hard spot 234 on the tire 40 at a location 180 degrees away from the location 236 of the first harmonic soft spot 232 indicated by the signal in FIG. 4. The maximum constraint occurs at the location of maximum axial displacement D2 relative to the mid-circumferential plane M of the tire 40 which is to the far right in the correction station 140 as viewed in FIGS. 1 and 6. A minimum amount of constraint (or no constraint at all i.e., a gap) is applied to the sidewalls of the tire 40 at the location of the first harmonic soft spot 232 indicated by the signal and known to the controller 166 and correction station 140. The minimum constraint occurs at the location of minimum axial displacement D1 relative to the mid-circumferential plane M of the tire 40.

FIGS. 8 and 9 illustrate the effect of plate constraint on the sidewall of a tire 341 without a rim protector. FIG. 8 shows a tire 341 that is inflated and constrained by plate 325 that has no angled surface 27. Carcass reinforcing member 306 extends between belt package 346 and bead 342. In this constrained condition, the carcass reinforcing member 306 has a radius of curvature R2 corresponding to the displacement of the sidewall by plate 325. FIG. 9 is a schematic illustration of carcass reinforcing member 306 being corrected by plate 325. A portion 302 of the carcass reinforcing member 306 prior to being constrained is illustrated in FIG. 9 by a dashed line. This portion 302 of the carcass reinforcing member 306 has an upper end point 304 at which load in the carcass reinforcing member 306 is transmitted to the belt package 346 of tire 341. The portion 302 of the carcass reinforcing member 306 has a lower end point 308 in the area of the bead 42 (FIG. 8) at which load in the carcass reinforcing member 306 is transmitted to the bead of tire 341. The deflected portions 312 of the portion 302 of the carcass reinforcing member 306 are illustrated in FIG. 9 with a solid line. The deflection distance 310 is illustrated in FIG. 9 to correspond to the amount of constraint applied by plate 325 as shown in FIG. 8.

In the deflected portions 312 of the carcass reinforcing member 306 it will be apparent that the original or unconstrained radius of curvature R1 of the carcass reinforcing member 306 has changed and is now a relatively smaller radius of curvature R2 in two locations. When the interior of tire 341 is subjected to the same relatively high inflation pressure (e.g., 100 psi or 7 bars) tire 341 having radius of curvature R2 will not be permanently elongated the same amount as the unconstrained portion 302 of the carcass reinforcing member 306 having the relatively larger radius of curvature R1. The relationship between tension in the carcass reinforcing member 306, radius of curvature R in the reinforcing member 306 and inflation pressure in tire 341 can be represented by the formula T=R*P, where T is the tension force in the portion 302 of the carcass reinforcing member 306, R is the radius of curvature of the portion 302 or 312 of the carcass reinforcing member 306, P is the internal inflation pressure in tire 341 causing tension in the portion 302 of the carcass reinforcing member 306. Thus, it will be apparent that for a constant inflation pressure P, the larger the radius of curvature R of the portion 302 of the carcass reinforcing member 306, the higher the tension T acting on that portion of the carcass reinforcing member.

As stated above, the larger radius of curvature R1 in the portion 302 occurs at the location of minimum constraint around tire 341 as determined by the configuration of heights for plates 325 (or plates 23 as shown in FIG. 7) while a smaller radius of curvature R2 occurs at the locations of maximum constraint—e.g., higher plate 325 height. When tensions exceed the elastic limit of the carcass reinforcing member 306, a higher tension in the portion 302 of the carcass reinforcing member 306 generally results in a relatively greater elongation relative to portions 312 having less tension. The increased tension, when held even for a relatively short period of time above the elastic limit of the carcass reinforcing member 306, results in the permanent deformation by stretching of the carcass reinforcing members 306. The permanently longer each carcass reinforcing member 306 gets relative to its prestretch length, the "harder" it becomes in terms of radial force variation due to its permanent elongation. What has actually taken place during the correction operation is correction by introducing a radial runout to the tire 341. This introduced radial runout offsets the first harmonic radial force variation regardless of the attribute of the tire 341 producing the radial force variation. Accordingly, the resulting radial force variation (be it composite or first harmonic) is reduced during rotation of the tire 40.

Returning to FIGS. 1, 5, 6, and 7, the controller 166 or other computer may be used to determine the amount and location of displacement along tire 40 that will be created by supporting rings 182 (182U and 182D) and plates 23. A database can be developed to help determine e.g., plate heights 23 as a function of variables such as the magnitude of correction desired, tire size, and construction of the carcass reinforcing members. The database can be continually updated to incorporate the history of previously corrected tires. The database may also be originally provided with representative data from various tire sizes and models to allow the analysis and prediction of the correction that will result from a given configuration of the supporting rings 182 with plates 23 and spacers 22. As the database is updated through use, the accuracy of the prediction could be expected to improve for tires of various sizes and models.

In addition, supporting rings 182 allows for the simultaneous correction of multiple harmonics. For example, referring again to FIG. 4, correction of the first harmonic for tire 40 would require correction at location 236 of soft spot 232. Such a correction would require a location of maximum constraint located at only one circumferential position along the sidewalls 64 of tire 40. For the wave of FIG. 4, such location would be at hard spot 234 or one-hundred and eighty degrees (180) opposite soft spot 232. However, for a given tire 40, a decomposition of the composite wave form of FIG. 3 into multiple harmonics may indicate that more than one harmonic should be corrected. For example, analysis may indicate that both the first and second harmonic should be corrected. However, as shown in FIG. 4, the locations required for maximum and minimum constraint of the sidewall of tire 40 may not be identical for both the first and second harmonic. For example, in the wave forms illustrated in FIGS. 3 and 4, the locations 216, 236, and 237 of the respective soft spots 212, 232, and 233 may be offset relative to one another. This results because the Fourier analysis defines the locations of the soft spot and hard spot of, for example, of the first harmonic wave form as being 180 degrees apart. Similar even spacing of the respective adjacent soft and hard spots of the other harmonic wave forms also occur. Yet, the soft spot 212 of the composite wave form is not necessarily spaced 180 degrees from the hard spot 214 but occurs as sensed during testing. For example, in the composite wave form illustrated in FIG. 3, the soft spot 212 is spaced approximately 150 degrees from the hard spot 214. Thus, the location of constraints for correcting two or more harmonics made not coincide. Similarly, the magnitude of correction needed (and thus the corresponding plate heights required) may also be different for different harmonics such as e.g., the first and second harmonic.

Unfortunately, correcting multiple harmonics through successive inflation and deformation operations aimed at separate harmonics may have the undesirable effect of adding or increasing a uniformity characteristic. More specifically, attempting to correct the second harmonic of tire 40 after correcting the first harmonic could actually make the first harmonic worse or even introduce a new harmonic problem through the repeated deformations. To avoid this undesirable result, supporting ring 182 allows for the correction of multiple harmonics simultaneously by dividing its contact surface into the multiple plates 23 having heights that are independently adjustable relative to plate 21. As such, supporting ring 182 allows for having multiple points of constraint of varying magnitudes around the sidewalls of tire 40 so that more than one harmonic can be corrected simultaneously during a single inflation and deformation procedure rather than through multiple inflations and repeated deformations. For example, a first plate 23 may be placed at a specific position and height along the supporting ring 182 to correct a first uniformity characteristic while a second plate 23 may also be placed along supporting ring 182 at another specific position and height in order simultaneously correct a second uniformity characteristic. The heights of the first and second plates 23 may differ depending upon e.g., the magnitude of the correction desired. As previously stated and described with regard to FIGS. 1, 5, and 6, such a support ring 182 would be applied to both sides of tire 40 (182U and 182D) with the first and second plates 23 placed on each supporting ring 182U and 182D. However, it should be noted that the present invention includes constructions where only one supporting ring is applied to the tire. In such case, if only one supporting ring 182 is applied to one sidewall of tire 40, then some other element or surface should be used to constrain the other sidewall of tire 40.

As previously mentioned, additional complications result when attempting to correct uniformity characteristics in a low profile tire or a tire having a low profile or having a projection such as e.g., a rim protector along its sidewall. For example, referring now to FIG. 10, tire 40 has a rim protector 11 along sidewall 64. Assuming FIG. 10 represents the unconstrained or minimally constrained portion of a tire having a uniformity characteristic, analysis of the composite wave form including its Nth order harmonics may indicate that carcass reinforcing member 45 should be permanently deformed at a particular location along the circumference of tire 40 as previously described. Deformation will preferably be performed along the "free cord length" portion 65 of the carcass reinforcing member 45. As used herein, "free cord length" is the section 65 of the carcass reinforcing member 45 in sidewall 64 that is most responsive to permanent elongation. Generally, this portion is the length 65 of the carcass reinforcing member 45 between the shoulder 13 and the bead 42 that is unsupported by other materials such as bead filler 14.

Unfortunately, the use of a flat plate 25 on the maximally constrained portion of the tire 40 as previously described may lead to undesired, permanent deformations in this constrained portion of tire 40. More specifically, FIG. 11 depicts the maximally constrained portion of tire 40 during the application of a flat plate 25 and pneumatic pressure in order to attempt correction of a uniformity characteristic as previously described. Application of a flat plate 25 to tire 40 impacts rim protector 11 to distort the toroidal profile of tire 40. Upon inflation, undesired deformation of carcass reinforcing member 45 occurs along sections 67 and 69 of carcass reinforcing member 45. Depending upon the magnitude and location of this undesired deformation, a uniformity characteristic may actually be added to tire 40 by this process. Similar undesired deformations can occur in low profile tires.

FIG. 12 illustrates an exemplary embodiment of the present invention in which a angled or cone-shaped plate 23 is applied to the sidewall of tire 40. The contact surface 27 is positioned at an angle θ to the mid-circumferential plane M of tire 40. As such, contact between plate 23 and rim protector 11 does not create a distortion of the toroidal profile of tire 40. During proper inflation to correct a uniformity characteristic, undesired deformation of carcass reinforcing member 45 is thereby minimized or avoided.

To determine the optimal value for angle θ, finite element analysis (FEA) can be used to predict the response of tire 40 to plate 23 at various values for angle θ and at various distances between plate 23 and tire 40's sidewalls. For example, in one exemplary method of the present invention, a two-dimensional model of a toroidal section of tire 40 and its mounting rim is created along with two plates 23 positioned beside each sidewall of the tire. Movement of the plates 23 towards each sidewall of the inflated tire 40 is simulated using FEA to model each iteration of movement of the plates 23. For each iteration, tire 40 should remain mounted on the rim and convergence must be achieved. As the model is continued, tire 40 is subjected to an appropriate test pressure. After each convergence, the simulation is repeated as the plates 23 are moved towards the sidewalls of tire 40 and eventually into the desired position—i.e., the position providing the desired magnitude of constraint of tire 440 for the given test pressure.

Once the plates 23 are in the desired position along each sidewall of the tire 40 (one side of which is illustrated in FIG. 12), the position of the free cord length 65 (FIG. 10) is noted as well as the general shape of the sidewall of tire 40. Preferably, the portion of tire 40 along the free cord length 65 is in contact with plates 23 and there are no excessive deformations of the sidewall that would cause localized stress concentrations. More specifically, it is preferable to avoid large, non-uniform deformations of the sidewall that could cause localized stress concentrations leading to permanent changes in the length of carcass reinforcement member 45. It should be understood that while angled plates 23 will typically be applied to both sides of the tire, the present invention includes applications where angled plates 23 are applied only to one side of the tire such as when e.g., the tire has a rim protector 11 or other protruding physical feature along only one sidewall. Also, multiple angled plates may be used to correct more than one harmonic simultaneously as previously described.

Using this method, applicants determined that angles θ of both 10 degrees and 20 degrees are useful in providing constraint to a tire while avoiding or minimizing unwanted deformations. In addition, an angle θ of 5 degrees is effective for certain low profile tires without a rim protector while an angle θ of 30 degrees is effective for certain low profile tires having a rim protector that provides a large projection from the sidewall. Ranges in between should also be effective depending upon tire size and architecture.

It should be understood that the present invention includes various other modifications that can be made to the exemplary embodiments described herein that come within the scope of the appended claims and their equivalents. These and other embodiments of the present invention are with the spirit and scope of the claims that now follow.

The invention claimed is:

1. A method for reducing a uniformity characteristic of a tire through deformation, the tire having sidewalls, the tire defining a circumferential direction, an equator, and a mid-circumferential plane, the method comprising the steps of:
   generating a signal indicative of the magnitude and location about the circumferential direction of the uniformity characteristic for the tire;
   selecting at least one position about the circumferential direction of the tire for constraint during deformation of the tire, wherein the at least one position is selected as a function of the location of the uniformity characteristic as determined from the signal;
   determining a non-zero angle θ for a contact surface that will contact at least one sidewall of the tire at the at least one position and at the equator, where angle θ is the angle between the contact surface and the mid-circumferential plane of the tire;
   constraining the sidewall of the tire using the contact surface having angle θ; and
   permanently deforming the tire so as to simultaneously reduce the uniformity characteristic while minimizing deformation to the at least one sidewall at the at least one position.

2. A method for reducing a uniformity characteristic of a tire through deformation as in claim 1, further comprising the step of decomposing the signal from said generating step into at least two harmonics, wherein said selecting step comprises selecting at least two positions about the circumferential direction of the tire for constraint during deformation of the tire, and wherein the at least two positions are selected used upon the at least two harmonics from said decomposing step.

3. A method for reducing a uniformity characteristic of a tire through deformation as in claim 1, wherein said step of determining an angle θ includes finite element analysis of a model of the tire.

4. A method for reducing a uniformity characteristic of a tire through deformation as in claim 1, wherein the amount of deformation of the tire in said permanently deforming step is determined as a function of the magnitude of the signal.

5. A method for reducing a uniformity characteristic of a tire through deformation as in claim 1, wherein the angle θ is in the range of about 5 degrees to about 30 degrees.

6. A method for reducing a uniformity characteristic of a tire through deformation as in claim 1, wherein the angle θ is about 10 degrees.

7. A method for reducing a uniformity characteristic of a tire through deformation as in claim 1, wherein the angle θ is about 20 degrees.

8. A method for reducing a uniformity characteristic of a tire through deformation as in claim 1, wherein the contact surface extends between a location adjacent to an annular belt of the tire to a location adjacent to a bead of the tire.

9. A method for reducing a uniformity characteristic of a tire through deformation, the tire having sidewalls, the tire defining an equator, a circumferential direction, and a mid-circumferential plane, the method comprising the steps of:
   generating a signal indicative of the magnitude and location about the circumferential direction of the uniformity characteristic for the tire;
   selecting at least one position about the circumferential direction of the tire for maximum constraint and minimum deformation of the sidewalls at the least one position during deformation of the tire, wherein the at least one position is selected as a function of the location of the uniformity characteristic as determined from the signal;
   determining a non-zero angle θ for a contact surface that will contact at least one sidewall of the tire at the at least one position, where angle θ is the angle between the contact surface and the mid-circumferential plane of the tire;
   constraining the sidewall of the tire at the at least one position and the equator using the contact surface having angle θ; and
   permanently deforming the tire so as to reduce the uniformity characteristic while maximizing deformation to the at least one sidewall at a different location from the at least one position.

10. A method for reducing a uniformity characteristic of a tire through deformation as in claim 9, the tire defining an equatorial plane, wherein said step of constraining further comprises contacting the tire sidewall along the equator plane with the contact surface.

11. A method for reducing a uniformity characteristic of a tire through deformation as in claim 9, wherein the contact surface extends between a location adjacent to an annular belt of the tire to a location adjacent to a bead of the tire.

12. A method of using deformation to reduce a uniformity characteristic of a tire, the tire having sidewalls, the tire defining a circumferential direction and an equator, the method comprising the steps of:
   generating a signal indicative of the magnitude and location about the circumferential direction of the uniformity characteristic for the tire;
   selecting at least one position about the circumferential direction of the tire for deformation of the sidewalls, wherein the at least one position is selected based upon the signal from said step of generating;
   determining a non-zero angle θ for a contact surface that will contact at least one sidewall of the tire at the at least one position and along the equator, where angle θ is the angle between the contact surface and a mid-circumferential plane defined by the tire;
   constraining the sidewall of the tire at the at least one position using the contact surface having angle θ; and
   permanently deforming the tire so as to reduce the uniformity characteristic.

13. A method for reducing a uniformity characteristic of a tire through deformation as in claim 12, wherein the contact surface extends between a location adjacent to an annular belt of the tire to a location adjacent to a bead of the tire.

14. A method for reducing a uniformity characteristic of a tire through deformation as in claim 12, wherein the tire has an equator, and wherein the contact surface is to the tire sidewall along the equator.

* * * * *